United States Patent [19]
Collot et al.

[11] Patent Number: 5,042,073
[45] Date of Patent: Aug. 20, 1991

[54] SIGNATURE VERIFICATION METHOD AND SYSTEM WITH OPTIMIZATION OF STATIC PARAMETERS

[75] Inventors: Richard Collot; Mohammed Achemlal, both of Caen; Marie-Josèphe Revillet, Verson, all of France

[73] Assignee: L'Etat Francais represente par le Ministre des Postes et Telecommunications (Centre National d'Etudes des Telecommunications), Issy-les-Moulineaux, France

[21] Appl. No.: 543,887
[22] Filed: Jun. 27, 1990
[30] Foreign Application Priority Data
Jul. 6, 1989 [FR] France ................. 89 09090
[51] Int. Cl.⁵ .................................. G06K 9/00
[52] U.S. Cl. ............................ 382/3; 382/38
[58] Field of Search .................. 382/38, 14, 3
[56] References Cited
U.S. PATENT DOCUMENTS
4,718,102  1/1988  Crane et al. ................. 382/38
4,955,060  9/1990  Katsuki et al. .............. 382/38

Primary Examiner—Stephen Brinich
Attorney, Agent, or Firm—Fleit, Jacobson, Cohn, Price, Holman & Stern

[57] ABSTRACT

A system embodying the invention for verifying signatures appended to bank checks comprises a check feed stand, a CMC7 code reader, a video camera and a control equipment. The checks are conveyed across the stand and are read in turn by the code reader and the camera which respectively issue the identity of the account holder and an image of the signature appended to the check. The control equipment is preferably comprised of a microcomputer in which algorithms are resident to authenticate the signatures by comparison with previously recorded reference signatures. The signatures are represented by static parameters relating to the shapes and dimensions of their drawings. The verification method embodying the invention therein comprises an optimization algorithm resident in the control equipment in order to specifically select for each signature the parameters that should be used to minimize a decision error.

6 Claims, 4 Drawing Sheets

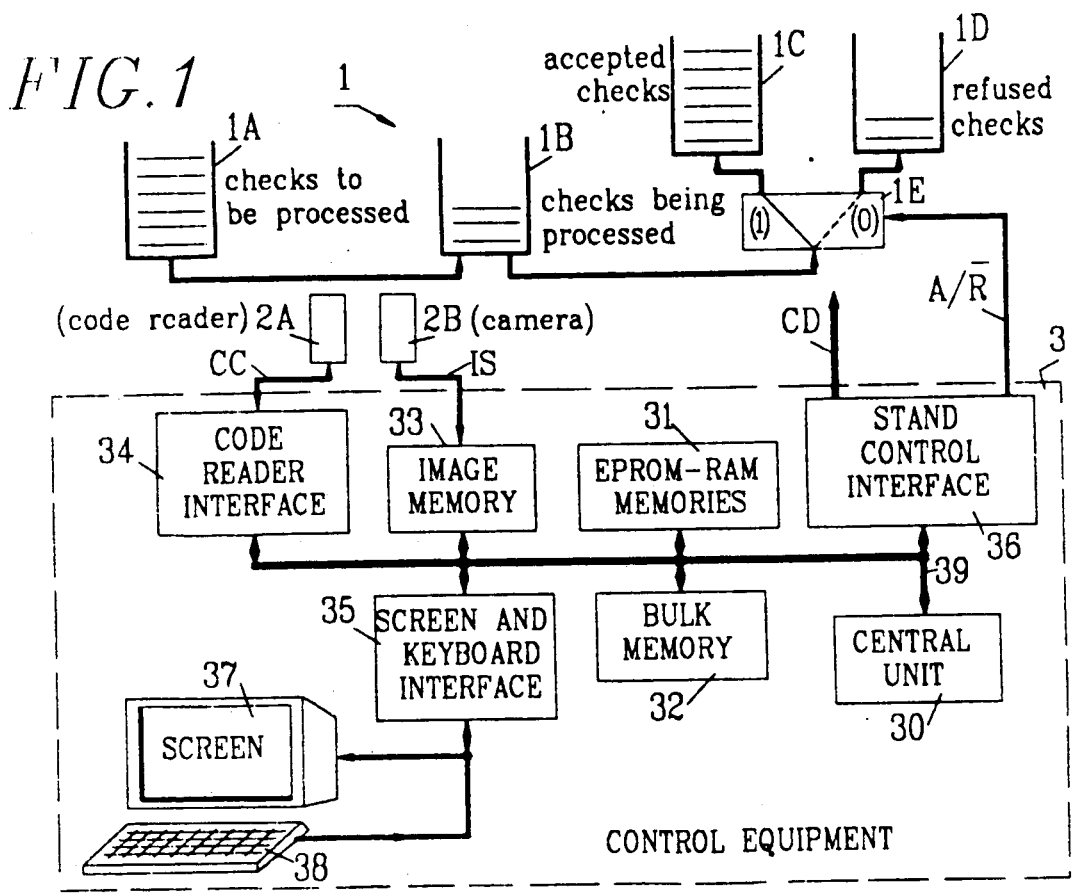

FIG. 3
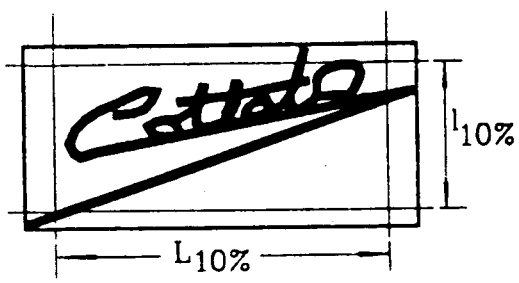
FIG. 4
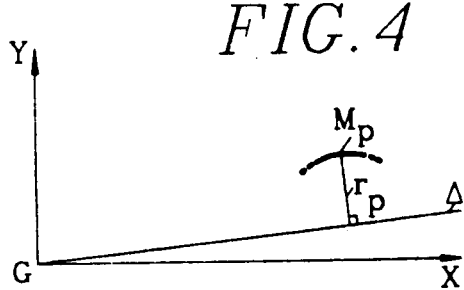
FIG. 5
| | | |
|---|---|---|
| 0 1 .<br>0 * .<br>. . . | . 1 0<br>. * 0<br>. . . | Point * of vertical direction |
| 0 0 .<br>1 * .<br>. . . | . . .<br>1 * .<br>0 0 . | Point * of horizontal direction |
| 1 . .<br>0 * .<br>. . . | 1 0 .<br>. * .<br>. . . | Point * of first oblique direction |
| . . 1<br>. * 0<br>. . . | . 0 1<br>. * .<br>. . . | Point * of second oblique direction |
FIG. 6
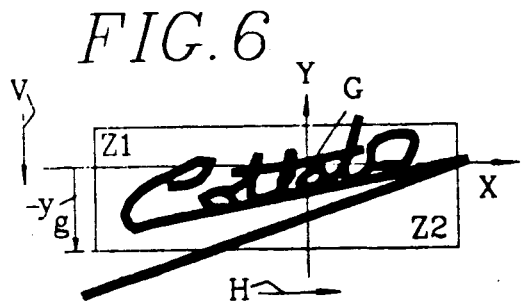
FIG. 8
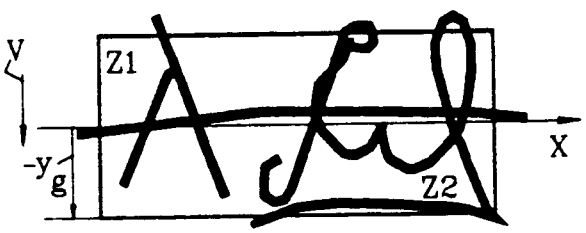
FIG. 7
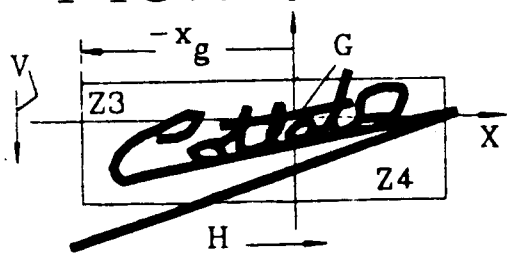
FIG. 9
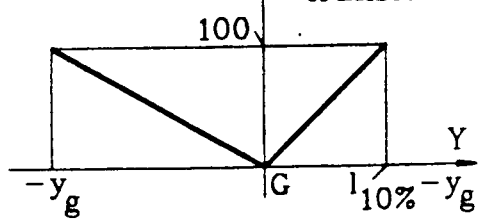

SIGNATURE VERIFICATION METHOD AND SYSTEM WITH OPTIMIZATION OF STATIC PARAMETERS

BACKGROUND OF THE INVENTION

1. Field of the Invention

This invention relates more particularly to static-type signature verification systems. Nevertheless, the invention is also applicable for mixed-type signature verification systems in which static parameters and dynamic parameters are processed.

2. Description of the Prior Art

A static signature verification system processes handwritten signatures appended to base materials such as paper documents. The system is designed to authenticate signatures, i.e. to verify their conformity, by comparison with reference signatures recorded previously in the system. The signatures are represented by static parameters relating notably to shapes and dimensions of their drawings.

An important field of application of static signature verification is that of the verification of signatures appended to bank checks. In fact, in banking institutions, the signatures appended to checks are not systematically verified due to the very high cost that manual verification would entail. Only signatures on checks for large amounts or corresponding to particular bank accounts are verified. Banking institutions incur significant financial losses as a result of falsified checks. Automation of verification operations would enable systematic verification of signatures on checks and is therefore the solution required to avoid such losses.

Another field of application of static signature verification is that of the biometrical authentication of people. In fact, by adding a static verification of the drawing of a signature subsequent to a dynamic verification as the signature is written, the performances of a verification system are very substantially improved due to the fact that it is virtually impossible for a counterfeiter to imitate both the stroke speed and the drawing of a signature.

The different static signature verification systems currently available are of Anglo-saxon origin. These systems have the disadvantage of having been devised more specifically for processing Anglo-Saxon-type signatures, which are mainly cursive signatures. Mediocre performances are obtained with French signatures, and more generally with signatures of Latin origin, due to these signatures being of different types, cursive, graphic and mixed (cursive-graphic).

A further disadvantage of these systems is that the assembly of parameters used to represent the signatures is determined for once and for all and does not vary from one person to the next. Such an approach is open to criticism since the reliability of a parameter varies substantially from one person to the next and a very stable parameter for one person is sometimes very variable for another person.

OBJECT OF THE INVENTION

The main object of this invention is to provide a signature verification method and systems devoid of the aforesaid drawbacks.

SUMMARY OF THE INVENTION

Accordingly, there is provided a method embodying the invention for verifying the conformity of sample signatures with reference signatures according to which the signatures are respectively represented by files comprising the values of several parameters of the static type notably, wherein the files are comprised of a variable number of parameters specifically selected from among a predetermined set of parameters by an optimization algorithm in such a way as to minimize decision errors, the predetermined set of parameters being comprised of parameters that are representative of graphic and/or cursive signatures.

A signature verification system embodying the invention to implement the above method therein comprises means for reading the sample signatures to be verified on respective supports thereby providing digital signals representative of said sample signatures, means for detecting the supposed identities of signatories of said sample signatures on said respective supports, means activated during a learning phase for producing reference files respectively associated to reference signatures by selecting of optimum parameters and calculating average values of said optimum parameters and parameter difference values from several samples of the reference signatures, means for memorizing the reference files, first means activated during an operational phase of verification of the sample signatures for calculating files of parameters corresponding to the sample signatures, second means for calculating the distances between the average values of the optimum parameters and the parameters of the sample signatures respectively in response to the supposed identities of the signatories addressing the reference files, and means for deciding the conformity of the sample signatures with the reference signatures as a function of comparisons of said distances with at least one decision threshold..

BRIEF DESCRIPTION OF THE DRAWINGS

Further features and advantages of the invention will be apparent from the following particular description of several preferred embodiments of this invention as illustrated in the corresponding accompanying drawings in which:

FIG. 1 is a block diagram showing the material structure of a system embodying the invention for verifying signatures appended to bank checks;

FIG. 2 is a functional block diagram of the system in FIG. 1;

FIGS. 3 to 13 relate to the definition of the static parameters calculated by the system for verifying signatures;

DESCRIPTION OF THE PREFERRED EMBODIMENTS

Figure 10:
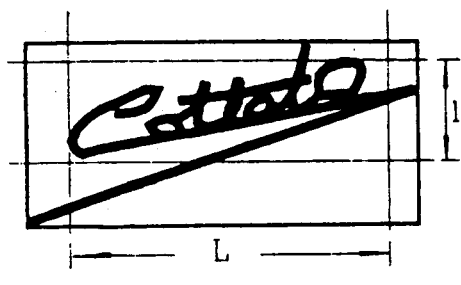

In reference to FIG. 1, the system embodying the invention is essentially comprised of four stores 1A to 1D equipping a check feed stand 1, a code reader 2A, a video camera 2B, and a control equipment 3.

The store 1A contains checks to be processed. The checks are extracted one by one from the store 1A by conventional mechanical means and are conveyed across the stand 1 towards the store 1B. During their transferral from the store 1A towards the store 1B, the checks are successively read by the code reader 2A and the camera 2B.

The purpose of the reader 2A is to read a CMC7-type code appended to a check in order to enable identification of the issuer of the check. A digital signal CC representative of the code CMC7 read on the check is transmitted by the reader 2A towards the control equipment 3.

The purpose of the camera 2B is to produce a digital image of the signature appended to the check. The camera 2B is preferably of the CCD type and issues at output digital signals IS transmitted to the control equipment 3.

After passing before the reader 2A and the camera 2B, the check is temporarily stocked in the store IB for a duration equal to at least a time required by the equipment 3 to process the corresponding signals CC and Is and to make a decision relating to verification of the signature. A decision signal $A/\overline{R}$ is produced by the equipment 3. The signal $A/\overline{R}$ in the state "1" indicates that the signature appended to the check has been authenticated and accepted by the control equipment 3 as being that corresponding to the issuer of the check indicated by the signal CC, subsequent to which mechanical switching means 1E extract the check from the store 1B and transfer it to the store 1C. The signal $A/\overline{R}$ in the state "0" indicates that the signature appended to the check has not been authenticated by the control equipment 3 as being that corresponding to the issuer of the check indicated by the signal CC, subsequent to which mechanical switching means 1E extract the check from the store 1B and transfer it to the store 1D. Checks accepted and refused by the equipment 3 are respectively stocked in the stores 1C and 1D. The refused checks contained in the store 1D will then be processed manually by an operator. In addition to the signal $A/\overline{R}$, various control signals CD are also supplied by the equipment 3 in order to control the operating of the check feed stand 1.

The control equipment 3 essentially comprises a central processing unit 30, EPROM and RAM-type program and working storages 31, a bulk memory 32 e.g. in the form of a hard disk, an image memory 33, interfaces 34, 35 and 36, and man-machine communication means in the form of a video screen 37 and a keyboard 38.

The central processing unit 30 is comprised e.g. of a microprocessor. The central processing unit 30 is connected in a conventional manner by data, address and control buses 39 to each of the elements 32 to 36 in equipment 3.

The bulk memory 32 is essentially intended to stock reference files for verifying signatures. If required, and notably in the case of the capacity of the EPROM memory not being sufficient, the bulk memory can partially or totally host a program and system management utilities as well as parameter calculation and signature verification algorithms.

The purpose of the image memory 33 is to memorize the digital images of signatures provided by the camera 2B. The images are typically comprised of 384×516 (columns × lines) pixels coded on 252 levels of grey. According to another embodiment of the invention, the image memory 33 is replaced by an image processing station, e.g. of the IDs 408 type, associated with the control equipment 3. The link between the camera 2B and the image space 33 is preferably of the DMA (Direct Memory Access) type.

The code reader interface 34 is connected to the code reader 2A via a communication port, e.g. a series link of the RS232 type. The interface 34 carries out a series-to-parallel conversion and supplies the signal CC in the form of words comprised of several parallel bits.

The purpose of the screen and keyboard interface 35 is to connect the screen 37 and the keyboard 38 to the equipment 3.

The stand control interface 36 produces control signals CD and the decision signal $A/\overline{R}$ from control words transmitted by the central unit 30.

In reference to FIG. 2, the processing described now is that carried out by the control equipment 3 during a learning phase and during an operational phase of signature authentication.

The learning phase is provided to calculate and set up in the equipment 3 reference parameter files that are required for verifying signatures during the operational authentication phase.

Let us take as an example that the system is configured for $I=100$ different signatures $S_1, S_2 \ldots S_i, \ldots S_I$ theoretically corresponding to different signers except in the event of some people having several signature patterns, where i is an integer index lying between 1 and $I=100$.

$I=100$ reference parameters files $FR_1, FR_2 \ldots FR_i, \ldots FR_I$ respectively corresponding to the $I=100$ signatures $S_1, S_2 \ldots S_i, \ldots S_I$ are memorized in the equipment 3. The files $FR_i$ are of different sizes and each contain a variable number of parameters determined for an optimum verification of the corresponding signature $S_i$. A reference parameter file $FR_i$ representative of a signature $S_i$ is identified by means of an address $AD_i$ corresponding to the account holder's CMC7 code.

During the learning phase, for each signature $S_i$, e.g. $J=10$ different samples $S_{i1}, S_{i2} \ldots S_{ij}, \ldots S_{iJ}$ corresponding to the reference signature $S_i$ are successively presented before the camera lens 2B and are read by the camera. Index j is an integer lying between 1 and $J=10$..

In the equipment 3, each of the signature images Is issued by the camera 2B is processed in an image processing program module 4A. The processing carried out by the module 4A on an image essentially comprises an image quality control, s binarizing of the image on first and second levels respectively corresponding to a white level and to a black level, filtering of the extraneous black spots on the surface image in excess of a predetermined threshold area, and the determination of a work window framing the signature very precisely. Preferably, the processing carried out is also visually controlled from the screen 37 by an operator.

A switch 4B with two positions PA and PO is schematically represented in FIG. 2. The positions PA and PO respectively correspond to the learning phase and to the operational authentification phase. When the equipment 3 is in the learning phase PA, the signature images issued by the module 4A are transferred towards an optimum reference parameter calculation and choice module 4C.

Typically for each of the signature samples $S_{ij}$, 30 parameters $a1_{ij}$ to $a30_{ij}$ are calculated by the module 4C. The parameters a1 to a30 are predetermined so as to be representative of cursive and/or graphic signatures. The list of these parameters is provided below:

Dimensions ratio of a work window at 10% containing the signature (parameter a1);

standardized moment of inertia of the signature in relation to the axis of abscissa X (parameter a2);

Standardized moment of inertia of the signature in relation to the axis of coordinates Y (parameter a2);

Shape factor (parameter a4);

Number of contour points in the vertical direction of the signature over the number of contour points of the signature (parameter a5);

Number of contour points in the horizontal direction over the total number of signature contour points (parameter a6);

Number of contour points in a first oblique direction over the total number of signature contour points (parameter a7);

Number of contour points in a second oblique direction over the total number of signature contour points (parameter a8);

Number of contour points on a half-perimeter of the window at 10% (parameter a9);

Level transition ratios (parameters a10 to a21);

Densities of level transitions (parameters a22 and a23);

Ratio of signature dimensions after elimination of the big strokes (a24);

Dimensions ratio of the signature with the big strokes to the dimensions of the signature without the big strokes (parameters a25 to a28);

Ratio of the length of a primary envelope of the signature to the half-perimeter of the window at 10% (parameter a29);

Ratio of the area of the primary envelope of the signature to the area of the window at 10% (parameter a30).

In reference to FIG. 3, dimensions $L_{10\%}$ and $l_{10\%}$ of a work window at 10% are calculated by eliminating 10% of the black spots of the signature on both sides of it. Greater stability of the dimensions is thus obtained due to the elimination of the ends of the big strokes, the lengths of which are not very stable. The parameter a1 is defined by the equality:

$$a1 = (100 \times L_{10\%})/l_{10\%}.$$

In reference to FIG. 4, let $\Delta$ be an axis passing through a center of gravity G of the signature and corresponding to a direction axis of the signature. Considering that each point $M_p$ of the signature has a mass equal to one, the moment of inertia $I\Delta$ of the signature in relation to the axis $\Delta$ is given by the equality:

$$I\Delta = \sum_{p=1}^{P} r_p^2 = a^2 \cdot \left(\sum_{p=1}^{P} y_p^2\right) + b^2 \cdot \left(\sum_{p=1}^{P} x_p^2\right) - 2ab \cdot \left(\sum_{p=1}^{P} x_p \cdot y_p\right),$$

in which $r_p$ is the distance from the point $M_p$ considered in relation to the axis $\Delta$, $x_p$ and $y_p$ are the coordinates of the point $M_p$ on an orthogonal graph (G, X, Y), a and b are the directive coefficients of the axis $\Delta$, and p is an integral index varying from 1 to a maximum value P in order to cover all the signature points to be processed.

The moments of inertia $I_X$ and $I_Y$ respectively in relation to the X and Y axes are defined by the equalities:

$$I_X = \sum_{p=1}^{P} x_p^2, \text{ and}$$

$$I_Y = \sum_{p=1}^{P} y_p^2.$$

The parameters a2, a3 and a4 are expressed by the equalities:

$$a2 = (1000 \times I_X)/l^2{}_{10\%} \times s),$$

$$a3 = (1000 \times I_Y)/L^2{}_{10\%} \times s), \text{ and}$$

$$a4 = (10 \times I_Y)/I_X,$$

s being the number of points in the signature.

In reference to FIG. 5, the signature contour points can have four different orientations. The orientation of a given contour point is determined as a function of the configuration of the surrounding points. The different possible configurations are shown in the form of a table in FIG. 5. The notations "1", "0" and "." respectively correspond to a white point, a black point, and a white or black point. The symbol "*" represents the white contour point under consideration. The parameters a5, a6, a7 and a8 are defined by the equalities:

$$a5 = (100 \times np_v)/np_c,$$

$$a6 = (100 \times np_h)/np_c,$$

$$a7 = (100 \times np_{d1})/np_c, \text{ and}$$

$$a8 = (100 \times np_{d2})/np_c,$$

in which $np_c$ is the total number of contour points, $np_v$ is the number of contour points in the vertical direction, $np_h$ is the number of contour points in the horizontal direction, $np_{d1}$ is the number of points in the first oblique direction, and $np_{d2}$ is the number of contour points in the second oblique direction.

It should be noted that the parameters a5 to a8 are invariant in relation to the thickness of the strokes and the size of the signature.

The parameter a9 is defined by the equality:

$$a9 = (100 \times np_c)/(l_{10\%} + L_{10\%}).$$

In reference to FIGS. 6 and 7, the parameters a10 to a21 are defined hereinunder. A transition is defined as a passing from a black point to a white point in the course of a line or column in the work window. The horizontal transitions (respectively the vertical transitions) are determined by the course of the lines (respectively the columns) in the work window.

In reference to FIG. 6, the work window is separated into two zones Z1 an Z2 by the X-axis passing through the center of gravity G of the signature. The zones Z1 and Z2 are firstly passed through in a horizontal direction H so as to determine the number of horizontal transitions $nbh_{Z1}$ and $nbh_{Z2}$ respectively in the zones Z1 and Z2. The zones Z1 and Z2 are then passed through in a vertical direction V so as to determine the number of vertical transitions $nbv_{Z1}$ and $nbv_{Z2}$ respectively in the zones Z1 and Z2.

In reference to FIG. 7, the work window is separated into two zones Z3 an Z4 by the Y-axis passing through the center of gravity G of the signature. The zones Z3 and Z4 are firstly passed through in a vertical direction V so as to determine the number of vertical transitions $nbv_{Z3}$ and $nbv_{Z4}$ respectively in the zones Z3 and Z4.

The zones Z3 and Z4 are then passed through in a horizontal direction H so as to determine the number of horizontal transitions $nbh_{Z3}$ and $nbh_{Z4}$ respectively in the zones Z3 and Z4.

The parameters a10 to a15 are defined by the following equalities:

$$a10 = (100 \times nbh_{Z1})/nbh_{Z2},$$

$$a11 = (100 \times nbv_{Z3})/nbv_{Z4},$$

$$a12 = (100 \times nbh_{Z1})/nbv_{Z3},$$

$$a13 = (100 \times nbh_{Z1})/nbv_{Z4},$$

$$a14 = (100 \times nbh_{Z2})/nbv_{Z3}, \text{ and}$$

$$a15 = (100 \times nbh_{Z2})/nbv_{Z4}.$$

The parameters a10 to a15 are not very sensitive to the position of the center of gravity G.

The parameters a16 to a21 are defined by the following equalities:

$$a16 = (100 \times nbh^*_{Z3})/nbh^*_{Z4},$$

$$a17 = (100 \times nbv^*_{Z3})/nbv^*_{Z2},$$

$$a18 = (100 \times nbh^*_{Z3})/nbv^*_{Z1},$$

$$a19 = (100 \times nbh^*_{Z3})/nbv^*_{Z2},$$

$$a20 = (100 \times nbh^*_{Z4})/nbv^*_{Z1}, \text{ and}$$

$$a21 = (100 \times nbh^*_{Z4})/nbv^*_{Z2}.$$

The symbol "*" above the numbers $nbh_{Z3}$, $nbh_{Z4}$, $nbv_{Z1}$ and $nbv_{Z2}$ in these last equalities indicates that for the calculation of said numbers, the value attributed to a transition is not a set determined value as for the calculation of the numbers $nbh_{Z1}$, $nbh_{Z2}$, $nbv_{Z3}$ and $nbv_{Z4}$, but is a value that is proportionately dependent on the position of the transition on the graph (G, X, Y). Indeed, the transition numbers $nbh_{Z3}$, $nbh_{Z4}$, $nbv_{Z1}$ and $nbv_{Z2}$ can vary very quickly with the position of the center of gravity G of the signature due to the fact that the corresponding course directions are, as regards calculation of these numbers, perpendicular to the axes H and V. In this way for instance, as illustrated with the signature shown in FIG. 8, if a big horizontal stroke of the signature is near the X-axis passing through the center of gravity G, the variations of the transitions numbers in the zones Z1 and Z2 will not be insignificant depending on whether said big stroke is above or below the X-axis. The same instability is likely to occur for big vertical strokes in the region of the center of gravity. The values of vertical transitions are weighted by a curve such as that shown in FIG. 9. In this curve, $-y_g$ represents the ordinate of the lower edge of the work window. Likewise, the values of the horizontal transitions are weighted by a curve similar to that in FIG. 9 in which Y, $-y_g$ and $1_{10\%}$ are respectively replaced by X, $-x_g$ and $L_{10\%}$, where $-x_g$ represents the abscissa of the left edge of the work window.

The parameters a22 and a23 representative of the transition densities are calculated from the numbers of the transitions $nbh_{Z1}$, $nbh_{Z2}$, $nbv_{Z3}$ and $nbv_{Z4}$:

$$a22 = (nbh_{Z1} + nbh_{Z2})/1_{10\%}, \text{ and}$$

$$a23 = (nbv_{Z3} + nbv_{Z4})/L_{10\%}.$$

In reference to FIG. 10, the parameter a24 is determined by the following equality:

$$a24 = (100 \times L)/1,$$

whereby L and 1 are the dimensions of the window containing the signature after elimination of the big strokes of the signature.

Figure 11:
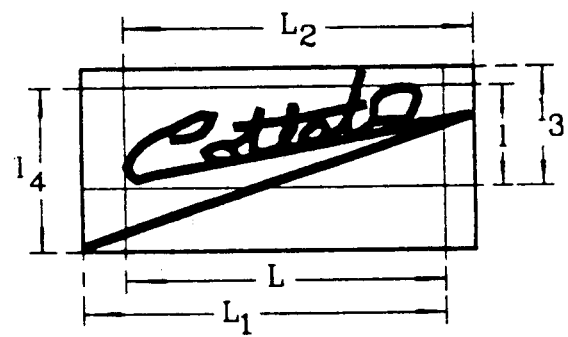

In reference to FIG. 11, the parameters a24 to a28 are representative of ratios of dimensions of the signature with the big strokes to dimensions of the signature without the big strokes:

$$a25 = (100 \times L_1)/L,$$

$$a26 = (100 \times L_2)/L,$$

$$a27 = (100 \times 1_3)/1, \text{ and}$$

$$a28 = (100 \times 1_4)/1.$$

Figure 12:
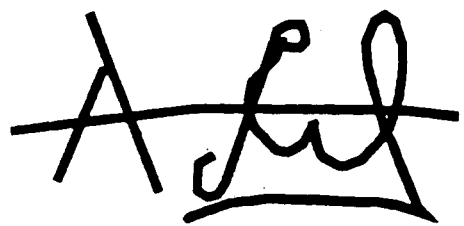
Figure 13:
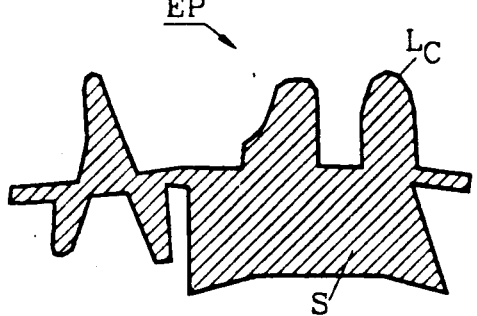

In reference to FIGS. 12 and 13, the primary envelope EP of the signature is determined by following a vertical scanning. Along a vertical line, the points included in the primary envelope are included between a first detected black-white transition and a last detected black-white transition. The length of the contour $L_C$ and the area S of the primary envelope are calculated. The parameters a29 and a30 are determined from the sizes $L_C$ and S, according to the following equalities:

$$a29 = (100 \times L_C)/(L_{10\%} + 1_{10\%}), \text{ and}$$

$$a30 = (100 \times S)/(L_{10\%} + 1_{10\%}).$$

Again in reference to FIG. 2, the module 4C calculates the parameters $a1_{ij}$ to $a30_{ij}$ corresponding to each sample of the signature $S_{ij}$ and organizes said parameters into I = 100 primary parameter files $FP_1$ to $FP_I$. The files $FP_i$ are saved in the memory and are represented in FIG. 2 by the module 4D. A file $FP_i$ is identified by the corresponding address $AD_i$ (CMC7) and contains parameters $a1_{i1}$ to $a30_{i1}$, $a1_{i2}$ to $a30_{i2}$, ... $a1_{iJ}$ to $a30_{iJ}$ corresponding to J = 10 samples $S_{i1}$ to $S_{iJ}$ of a same signature $S_i$. As shown in FIG. 2, the address $AD_i$ is transmitted by means of the code reader 2A or of the keyboard 38.

The processing carried out by the module 4C in order to determine the optimum reference parameters for each signature $S_i$ is now described.

For each signature $S_i$, two classes of signatures are considered, a class of authentic signatures SA and a class of false signatures SF. The class of authentic signatures SA corresponding to the signature $S_i$ is comprised of the J = 10 samples of the signature $S_i$. The class of false signatures for the signature $S_i$ is comprised of $(I-1) \times J = 99 \times 10 = 990$ samples corresponding to the $I - 1 = 99$ signatures $S \neq S_i$.

For each signature $S_i$, from the set of corresponding parameters $a1_{i1}$ to $a30_{i1}$, $a1_{i2}$ to $a30_{i2}$, ... $a1_{iJ}$ to $a30_{iJ}$ is calculated a statistical representation in the form of 30 average parameters $\overline{a1}_i$ to $\overline{a30}_i$ and of 30 corresponding differences $(a1_{i, max} - a1_{i, min})$ to $(a30_{i, max} - a30_{i, min})$ between the maximum and minimum values of the parameters.

In order to decide whether a signature $S_k$ is real or false, i.e. whether or not it conforms to the signature $S_i$, a distance D $(\overline{S}, S_k)$ is calculated between a first set of average parameters $\overline{b1}_i$ to $\overline{bQ}_i$, whereby Q is an integer index equal to 30 at most, taken from among the parameters $a1_i$ to $a30_i$ and a second set of parameters $b1_k$ to $bQ_k$ representative of the signature to be verified $S_k$ and taken from among the parameters $a1_k$ to $a30_k$ corresponding to the signature $S_k$. The distance D is defined as follows:

$$D(\overline{S}_i, S_k) = \sum_{q=1}^{q=Q} \Delta bq,$$

whereby $\Delta bq = |bq_k - \overline{bq}_i|/(bq_{i, max} - bq_{i, min})$.

The difference term $(bq_{i, max} - bq_{i, min})$ is introduced in order to weight the contribution of a parameter in proportion to its instability.

The optimization processing of the parameters for the signature $S_i$ consists in selecting the Q parameters $b1_i$ to $bQ_i$ that must be chosen from among the 30 available parameters $a1_i$ to $a30_i$. The optimization algorithm is described hereinafter in reference to FIG. 16 and is of the "Jacknife" or "Leave-one-out" type. The selection criterium used is the maximalization of a threshold difference ES:

$$ES = S_f - S_v.$$

The threshold $S_v$ is the decision threshold such that if the distance D is greater than the threshold $S_v$, then all the signatures of the class SA are accepted.

The threshold $S_f$ is the decision threshold such that if the distance D is lower than the threshold $S_f$, then all the signatures of the class SF are rejected.

Figure 14:
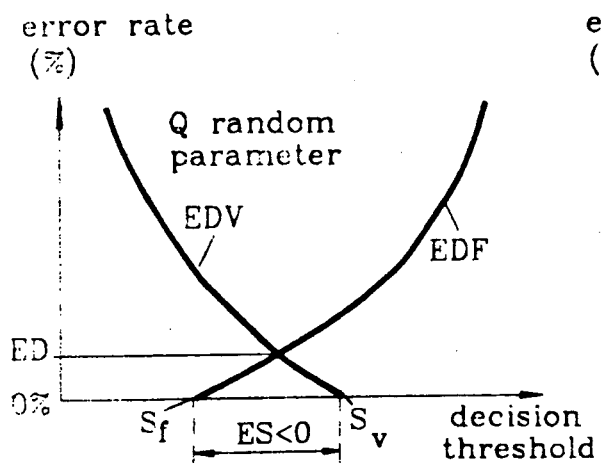
FIGS. 14 and 15 are charts showing evolution of error rate as a function of decision thresholds respectively with random parameters and with parameters selected by means of the optimization algorithm.

In reference to FIG. 14, in the case of the parameters not being selected, the threshold $S_v$ is usually higher than the threshold $S_f$, the threshold difference ES is negative whence a minimal decision error rate ED which is not nil, the rate ED being equal to the average rate between a rate of real signatures rejected EDV and a rate of false signatures accepted EDF.

Figure 15:
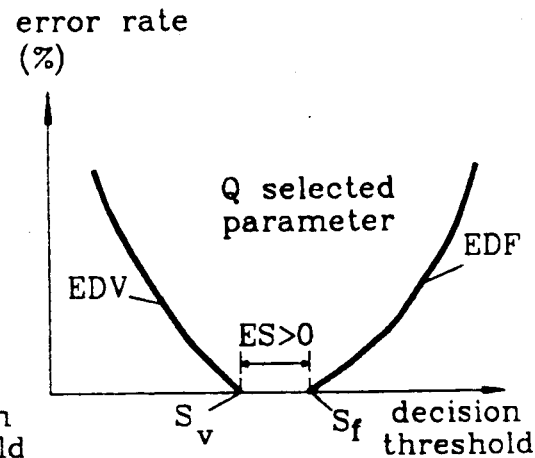

In reference to FIG. 15, in the case of the parameters being selected, the threshold $S_v$ is lower than the threshold $S_f$, the threshold difference ES is positive whence a minimal decision error rate ED that is theoretically nil.

Figure 16:
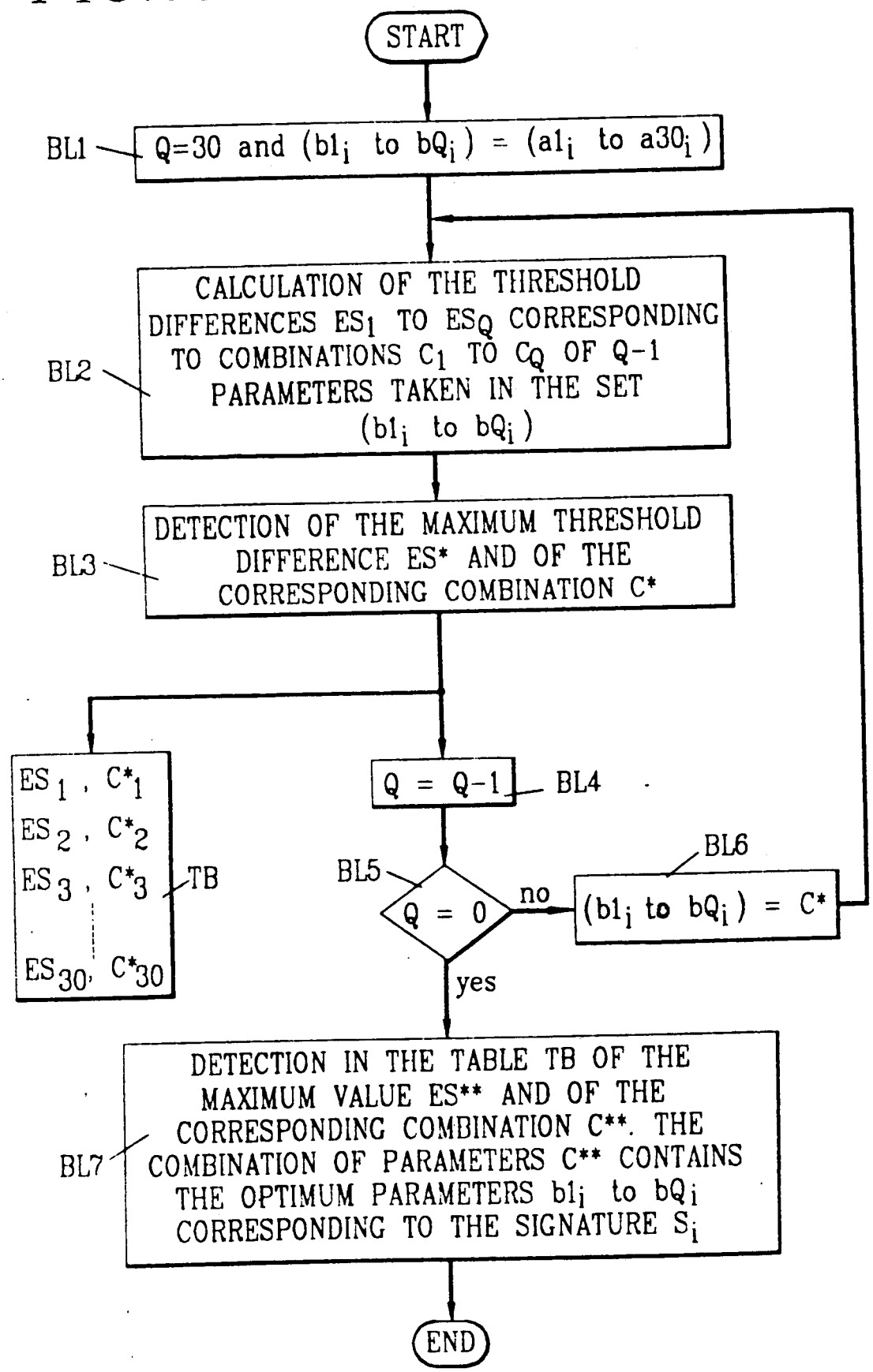
FIG. 16 shows details of the parameter optimization algorithm implemented in the system.

In reference to FIG. 16, the selection algorithm of the optimum parameters $b1_i$ to $bQ_i$ corresponding to the signature $S_i$ can be broken down into 8 processing blocks noted BL1 to BL7.

An initiation is carried out in the block BL1. The value 30 is attributed to the parameter number Q, and the set of parameters $b1_i$ to $bQ_i$ is taken equal to the set of possible parameters a1 to a30.

In the block BL2, Q different combinations $C_1, C_2, \ldots C_q, \ldots C_Q$ of $Q-1$ parameters each are considered, each taken from the set of parameters $b1_i$ to $bQ_i$. Each of the combinations $C_1$ to $C_Q$ is comprised of the set of parameters $b1_i$ to $bQ_i$ minus one of them:

$C_1 = (b2_i, b3_i, \ldots b(q-1)_i, bq_i, b(q+1)_i, \ldots bQ_i),$ $C_2 = (b1_i, b3_i, \ldots b(q-1)_i, bq_i, b(q+1)_i, \ldots bQ_i),$ $C_q = (b1_i, b2_i, \ldots b(q-1)_i, b(q+1)_i, \ldots bQ_i),$ $C_{Q-1} = (b1_i, b2_i, \ldots b(q-1)_i, bq_i, b(q+1)_i, \ldots b(Q-2)_i, bQ_i),$ and $C_Q = (b1_i, b2_i, \ldots b(q-1)_i, bq_i, b(q+1)_i, \ldots b(Q-2)_i, b(Q-1)_i).$ For each combination of parameters $C_q$, the distances $D(\overline{S}_i, S_k)$ are calculated in order to determine the distance thresholds $(S_f)_q$ and $(S_v)_q$ and the corresponding threshold differences $ES_q$.

In the block BL3, a maximum threshold difference $ES^*$ from among all the calculated threshold differences $ES_1$ to $ES_Q$ is detected, and the corresponding combination of parameters $C^*$ is retained.

In the block BL3, the maximum threshold difference $ES^*$ and the corresponding parameters combination $C^*$ are memorized in a table TB.

In the block BL4, the value of the number Q is decremented by 1.

In the block BL5, a comparison is made on the value of the number Q.

In the case of the value of the number Q being different to zero, in the block BL6 the set of parameters $b1_i$ to $bQ_i$ is identified at the last combination retained $C^*$ (BL3) and a further passing of the loop is carried out from block BL2.

In the case of the value of the number Q being equal to zero, the blocks BL2 to BL4 have been passed through 30 times and the table TB contains 30 maximum threshold differences $ES^*_1$ to $ES^*_{30}$ and 30 corresponding combinations $C^*_1$ to $C^*_{30}$. The block BL7 is then activated and a combination $C^{}$ corresponding to a maximum value $ES^{}$ is detected in the table TB. The selection is then completed and the optimum parameters $b1_i$ to $bQ_i$ for verifying the signature $S_i$ are contained in the combination $C^{**}$.

In reference to FIG. 2, the module 4E has $I = 100$ optimum reference parameter files $FR_1$ to $FR_I$ respectively corresponding to the $I = 100$ signatures $S_1$ to $S_I$. A file $FR_i$ contains the Q average optimum parameters $\overline{b1}_i$ to $\overline{bQ}_i$, corresponding to the signature $S_i$ and the Q differences $(b1_{i, max} - b1_{i, min})$ to $(bQ_{i, max} - bQ_{i, min})$.

During the operational authentication phase, the switch 4B is in the position PO and the signature images Is are transmitted towards a parameter calculating module 4F.

When a check passes before the code reader 2A and the camera 2B, an address $AD_i$ is issued by the reader 2A and at the same time the camera 2B issues the image IS of a signature $S_k$. The address $AD_i$ is supplied to the module 4E and selects in this module the corresponding reference parameter file $FR_i$. The module 4F receives data IP transmitted by the module 4E and advising it as to the parameters $b1_k$ to $bQ_k$ that should be calculated. The calculated parameters $b1_k$ to $bQ_k$, the parameters $\overline{b1}_i$ to $\overline{bQ}_i$ and the differences $(b1_{i, max} - b1_{i, min})$ to $(bQ_{i, max} - bQ_{i, min})$ contained in the file $FR_i$ are then respectively transmitted by the modules 4F and 4E and are supplied to a decision and distance calculating module 4G.

The module 4G calculates the distance $D(\overline{S}_i, S_k)$ from the parameters $\overline{b1}_i$ to $\overline{bQ}_i$, the differences $(b1_{i, max} - b1_{i, min})$ to $(bQ_{i, max} - bQ_{i, min})$ and the parameters blk to bQk. The calculated distance D is compared to a decision threshold S which is determined, during the learning phase, in such a way that all the real signatures are accepted. In the event of the distance D being lower than the threshold S, the signature $S_k$ is deemed in conformity with the signature $S_i$ and is accepted. In the event of the distance D being higher than the threshold S, the signature $S_k$ is deemed different to the signature $S_i$ and is refused.

What we claim is:

1. A signature verification method for verifying the conformity of sample signatures of graphic and/or cursive type with reference signatures comprising the steps of:

storing reference signatures respectively represented by files comprising values of several parameters of the static type notably, said files being respectively addressable by signatory identities of said reference signatures, wherein each of said files is comprised of a variable number of parameters specifically selected from among a predetermined set of parameters by an optimization algorithm in such a way so as to minimize decision errors;

simultaneously reading each of said sample signatures and the signatory identity associated with said sample signatures for addressing the parameters file of the reference signature responsive to the read signatory identity;

calculating the values of said specifically selected parameters of said sample signature into calculated values; and comparing said calculated values with the values of the specifically selected parameters of said reference signature to decide the correspondence of said sample signature with said reference signature.

2. The method claimed in claim 1, comprising an optimization algorithm of the "Jacknife" or "Leave-one-out" type in order to produce said reference files.

3. The method claimed in claim 1, comprising the following steps, in order to verify the conformity of a sample signature with a reference signature, calculating a distance D between parameters in the file of the sample signature and parameters in the file of the reference signature, said distance D being defined by the following relation:

$$D = \sum_{q=1}^{q=Q} |bq_k - \overline{bq_i}|/[bq_{i,\,max} - bq_{i,\,min}],$$

in which $bq_k$ corresponds to values of the parameters representative of the k-indexed sample signature, $\overline{bq_i}$ corresponds to average values of the i-indexed reference signature, $[bq_{i,\,max} - bq_{i,\,min}]$ represents a difference of maximum and minimum values corresponding to the parameters $bq_i$, and $Q$ is a number of parameters included in each of said files.

4. A signature verification system for verifying the conformity of sample signatures with reference signatures, the system comprising means for reading said sample signatures to be verified on respective supports thereby providing digital signals representative of said sample signature, means for detecting the supposed identities of signatories of said sample signatures on said respective supports, means activated during a learning phase for producing reference files respectively associated to reference signatures by selecting optimum parameters and calculating average values of said optimum parameters and parameter difference values from several samples of said reference signatures, means for memorizing said reference files, first means activated during an operational phase of verification of said sample signatures for calculating files of parameters corresponding to said sample signatures, second means for calculating the distances between said average values of said optimum parameters and the parameters of said sample signatures respectively in response to said supposed identities of said signatories addressing the reference files, and means for deciding the conformity of said sample signatures with said reference signatures as a function of comparisons of the distances with at least one decision threshold.

5. The signature verification system as claimed in claim 4, wherein said reference file producing means, said memorizing means, said first and second calculating means and said deciding means are embodied by program modules included in a control equipment of said system comprising a central processing unit such as a microprocessor.

6. The signature verification system as claimed in claim 4, wherein said supports are bank checks each including a signatory identity in the form of a CMC7-Type code and a signatory sample-signature, and wherein said reading means comprises a video camera and image processing means, and wherein said detecting means comprises a code reader for detecting and reading said CMC7-type codes appended to bank checks.

* * * * *